United States Patent
Reich et al.

(10) Patent No.: US 6,514,131 B1
(45) Date of Patent: Feb. 4, 2003

(54) HAND-HELD MACHINE TOOL WITH DUST EXTRACTION

(75) Inventors: Doris Reich, Stuttgart (DE); Steffen Wuensch, Holzgerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/743,487

(22) PCT Filed: Mar. 31, 2000

(86) PCT No.: PCT/DE00/00986

§ 371 (c)(1),
(2), (4) Date: Jan. 10, 2001

(87) PCT Pub. No.: WO00/73016

PCT Pub. Date: Dec. 7, 2000

(30) Foreign Application Priority Data

May 28, 1999 (DE) ......................................... 199 24 547

(51) Int. Cl.⁷ ............................................... B24B 23/00
(52) U.S. Cl. ...................... 451/344; 451/354; 451/453; 451/456
(58) Field of Search ................................. 451/344, 354, 451/356, 357, 358, 359, 451, 415, 453, 456

(56) References Cited

U.S. PATENT DOCUMENTS

| | | | |
|---|---|---|---|
| 5,349,752 A | * | 9/1994 | Stirm ....................... 144/252.1 |
| 5,467,835 A | | 11/1995 | Obermeier et al. |
| 6,047,693 A | * | 4/2000 | Yamami et al. .......... 125/13.01 |
| 6,139,411 A | * | 10/2000 | Everts et al. ................ 451/359 |

FOREIGN PATENT DOCUMENTS

| DE | 27 05 388 A | 8/1978 |
|---|---|---|
| DE | 44 38 549 A | 5/1995 |
| DE | 198 31 383 A | 1/2000 |
| EP | 0 558 253 A | 9/1993 |
| EP | 0 752 240 A | 1/1997 |

* cited by examiner

Primary Examiner—Timothy V. Eley
Assistant Examiner—Alvin J. Grant
(74) Attorney, Agent, or Firm—Michael J. Striker (57) ABSTRACT

A power tool (10) having a dust suction device (19) integrated into its housing (12) and having an ejection fitting (20) which is connected to the dust suction device (19) and can be detachably fastened with its injection fitting (22) to a dustproof dust box (21) is particularly suitable for containing sanding dust because of a number of side walls (34) of the dust box (21) have air openings (40) and on the inside, support at least one filter element (48), in particular a folded filter, which overlaps the air openings (40).

14 Claims, 8 Drawing Sheets

HAND-HELD MACHINE TOOL WITH DUST EXTRACTION

PRIOR ART

The invention is based on a power tool having a dust suction device integrated into its housing.

U.S. Pat. No. 5,467,835 has disclosed a hammer drill with a dust box and a fan attached to it which can suck drilling dust produced into the dust box. The suction air generated by the fan enters a suction conduit in the vicinity of the tool and is conveyed via this conduit into the dust box. In the box, the suction air passes through a dust filter embodied as a folded filter which separates out the drilling dust that collects in the dust box. The dust box has a bottom that pivots up for the removal of the folded filter and for the emptying of the drilling dust and is disposed together with the fan in a common housing that can be connected to the hammer drill by means of a relatively complex coupling.

The dust box of the known hammer drill can only be emptied with relative difficulty, and changing the folded filter is complicated. Furthermore, this dust box is unsuitable to be fastened in a self-supporting way to power tools with integrated dust suction for blow injecting the dust.

There are also known power tools with plastic cassettes used as dust boxes which can either be provided—like a reduced-scale grass-catcher for lawnmowers—with a multitude of air openings and lined with smooth-walled filter material or which are comprised of a porous, air-permeable plastic which cleans the air that blows the dust in and allows it to escape from the container while the dust is retained. These plastic cassettes have a tendency to permit fine dust to pass through, have a tendency to clog up, and are difficult to empty and clean.

ADVANTAGES OF THE INVENTION

The power tool with dust removal according to the invention has the advantage over the prior art that a very lightweight and rugged dust box is produced which has a particularly large filter surface area with a high degree of air permeability and improved fine dust filtration. Furthermore, because the dust box has a number of covers, it can be emptied more easily and in a more environmentally sound manner than dust boxes with only one cover.

Since the at least one cover is coupled in drawer fashion to the side walls of the dust box, the dust box can be opened in a particularly gentle manner so that the dust cannot be undesirably agitated or spilled.

Since the dust box is embodied as a skeletal body and its walls are embodied as covers which close in a dustproof manner and can be used in a detachable fashion and the air escape openings also have a folded filter, the air permeability is further improved while dust filtration is assured, wherein filter surfaces can be arbitrarily cleaned or replaced independently of each other.

Since at least one of the covers is coupled to the dust box by means of hinges, it can be opened in a controlled, gentle manner similar to the drawer-like embodiment. This prevents an undesirable spilling of dust.

Since the filter lamellas of the folded filter are disposed lateral to the longitudinal axis of the dust box, the incoming dust-laden air can be influenced so that a relatively low amount of turbulence and therefore a high vacuum action on the work piece being machined is assured.

Since dust baffles are disposed lateral to the longitudinal axis of the dust box, supported by side walls of at least one of the covers, the turbulence of the incoming dust-laden air is counteracted further so that the efficiency of the suction removal is further improved.

Since one of the side walls or the bottom part of the dust box is transparent at least in some areas, the fill level of the dust box can be monitored optically in much the same way as with a viewing glass.

Since only the covers respectively have a filter, in particular a folded filter, and as the only part of the dust box with air openings, the filter surface area can be dimensioned as particularly large. As a result, there is only a slight buildup of dust-laden air and the efficiency of dust suction removal is high. In addition, starting at a particular layer thickness, the dust can as a result automatically detach from the folded filter and under the influence of gravity, can fall into the dust box, from which it can easily be emptied.

Since the surface of the dust box supporting the cover is inclined in relation to the incoming air in such a way that the dust box tapers in a wedge shape toward the machine, dust-minimized flow conditions are produced which further improve the dust removal.

Since the cover is elastically affixed to the dust box in a sealed fashion, it is particularly easy to open and can easily be reclosed securely.

Since sealing lips are disposed in the inlet fitting of the dust box and engage in a sealing manner with the dust ejection fitting of the power tool, the dust box is coupled to the power tool in a reliable, dustproof manner.

Since the folded filter is disposed in cover-like parts of the dust box, it is particularly easy to replace due to the fact that it is either newly glued in place or the entire cover with the filter is replaced.

Since the dust box can be fastened to the power tool with detent locking means, it can be detached, emptied, and refastened in a particularly easy, reliable, time-saving manner.

Since the inlet fitting of the dust box can be closed by means of a valve, an undesirable escape of dust can be effectively prevented when the dust box is detached from the power tool.

DRAWINGS

The invention will be explained below in conjunction with the accompanying drawings.

DESCRIPTION OF THE EXEMPLARY EMBODIMENT

Figure 1:
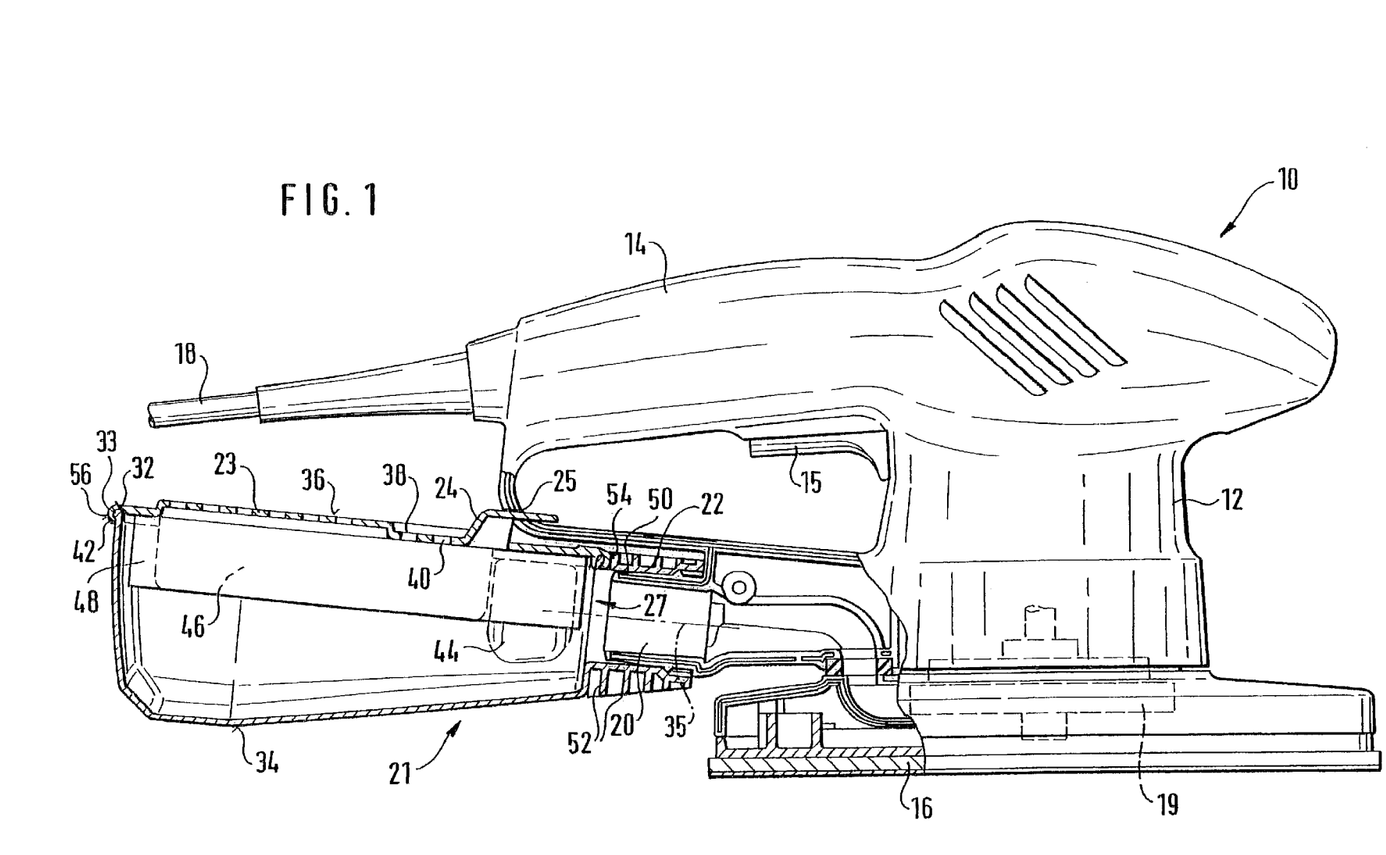
FIG. 1 is a partial longitudinal section through the power tool with dust box according to the invention.

FIG. 1 shows the longitudinal section through a power tool 10 embodied as an orbital sander with a housing 12, which has a handle 14 with a switch 15, the underside of which has a tool 16 movably fastened to it, which is embodied as a sanding plate with through openings. At the bottom end of the handle 14, the power tool 10 has an electric power cable 18 and inside the housing 12, it has a fan propeller 19. When the power tool is operated, this fan propeller 19 generates a vacuum above the sanding plate 16 and between the sanding plate 16 and a work piece. As a result, when the power tool 10 is operated, sanding dust is sucked through the through openings of the sanding plate 16 and is blown through an ejection fitting 20 of the housing 12 and into a dust box 21 via its injection fitting 22.

The ejection fitting 20 supports the injection fitting 22 of the dimensionally rigid, self-supporting dust box 21. This dust box is air tight—except for the injection opening 27 of the injection fitting 22 and its top side.

The top side 36 of the dust box 21 is constituted by a cover 23. This cover has a hook 24 that protrudes upward to engage in a retaining opening 25 of the housing 12 in the rear region of the handle 14. With the hook 24, the dust box 21 is also supported on the housing 12 of the power tool 10 so that the dust box 21 has particularly thin wall cross sections and is therefore particularly lightweight.

The cover 23 spring-elastically snaps on in detent fashion with its snap-edge 42 engaging positively, frictionally, and in a sealed fashion with the upper edge 32 of the dust box 21 because this upper edge constitutes a continuous bead 33 which fits fully into the snap-edge 42.

The underside 34 of the dust box 21 extends at an incline in relation to the axis 35 of the injection fitting 22 so that in the longitudinal section, the dust box 21 has a wedge-shaped contour that tapers toward the power tool 10. The top side 36 of the cover 23 has a number of uniformly distributed round air openings 40 which are each respectively preceded by a filter element 48 made of special paper, which is embodied as a folded filter, on the inside of the cover 23. The outside 49 (FIG. 9) of the filter element 48 is oriented toward the inside of the cover 23. In addition, in the vicinity of the hook 24, the top side 36 of the cover 23 is provided with an indentation 38 that is directed into the dust box 21 and has a u-shaped contour. This reinforces the structure of the cover 23 and creates free space for the entry of larger housing contours in the event that power tools other than the power tool 10 are combined with the dust box 21.

On opposite sides in its frontal region, close to the injection fitting 22, the dust box 21 has two curved indentations 44, which end at the bead 33, form recessed grips which allow the operator to grasp underneath the cover 23 with a finger, and make it easier to open the dust box 21.

The cover 23 has two side lamellas 46, which are of one piece with it and extend parallel to the side edges 58 and lateral to the front and rear edge 54, 56 (FIG. 2) of the dust box 21 and protrude in wedge fashion into the interior of the dust box 21 and thus absorb shock and pressure as a lateral limitation and mechanical protection for the filter element 48 in the event that this filter element is removed from the dust box 21 with the cover 23 in order to knock loose the dust adhering to the filter element 48.

On the inside, the injection fitting 22 of the dust box 21 has a continuous elastic sealing lip 50, which encloses the end of the ejection fitting 20 of the power tool 10 in an airtight manner. In addition, the injection fitting 22 of the dust box 21 has upper and lower external ribs 52 which improve the rigidity of the unit comprising the dust box 21 and the injection fitting 22.

Figure 2:
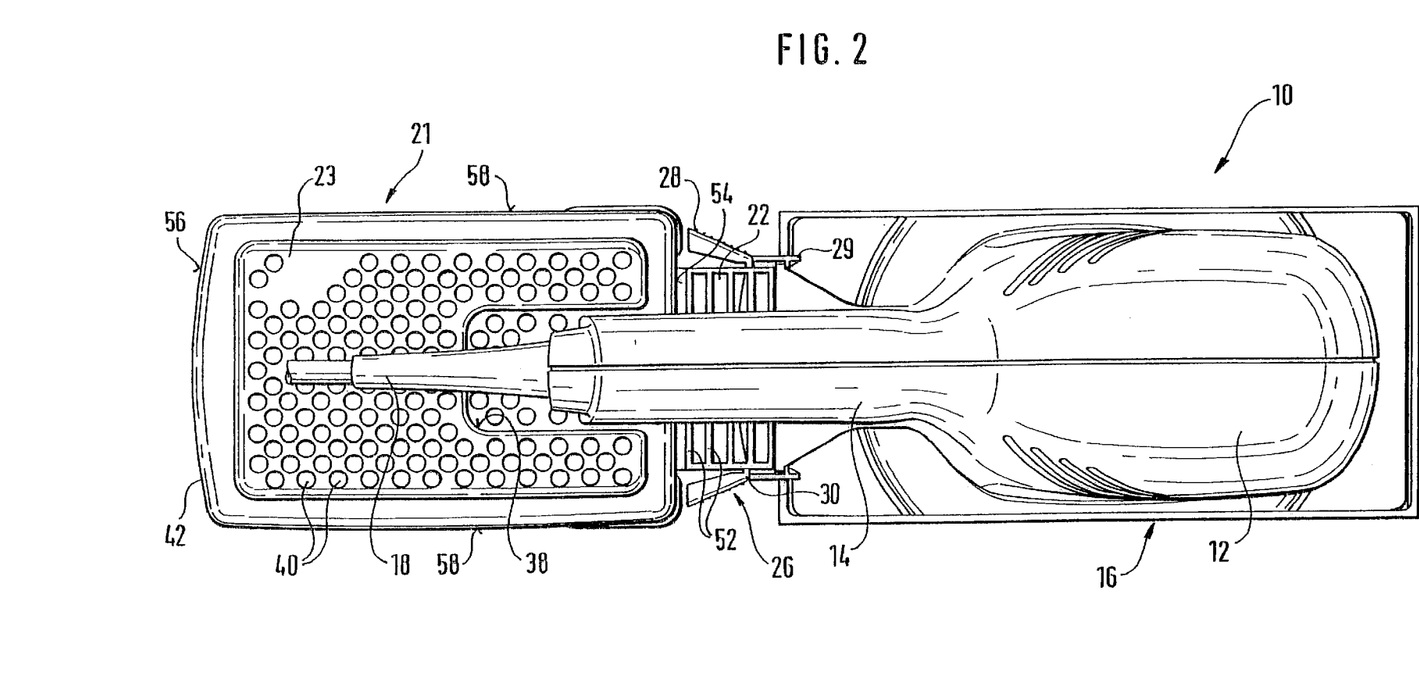
FIG. 2 is a top view according to FIG. 1.

FIG. 2 is a top view of the power tool 10 with the dust box 21 according to FIG. 1, wherein it is not necessary to refer to all of the details. The indentation 38 of the cover 23, the holes 40 for the outward passage of the dust-cleaned exhaust air, and a tilting bar 26 for the detent fastening of the dust box 21 to the power tool 10 are clearly shown. The tilting bar 26 of the dust box 21 is embodied as a dual arm lever whose one arm is embodied as push-button arm 28 and whose other arm is embodied as a detent arm 29. The tilting bar 26 is pivotably fastened to the injection fitting 22 of the dust box 21 by means of a film hinge 30, wherein the detent arm 29 engages with a lateral projection of the housing 12, not shown in detail, close to the ejection fitting 20. The projection is dimensioned so that the detent arm 29 is elastically prestressed by it.

It is also clear that the bottom surface of the power tool 10 is constituted by the rectangular sanding plate 16 and that the rear edge 56 of the dust box 21 and the cover 23 are curved outward.

Figure 3:
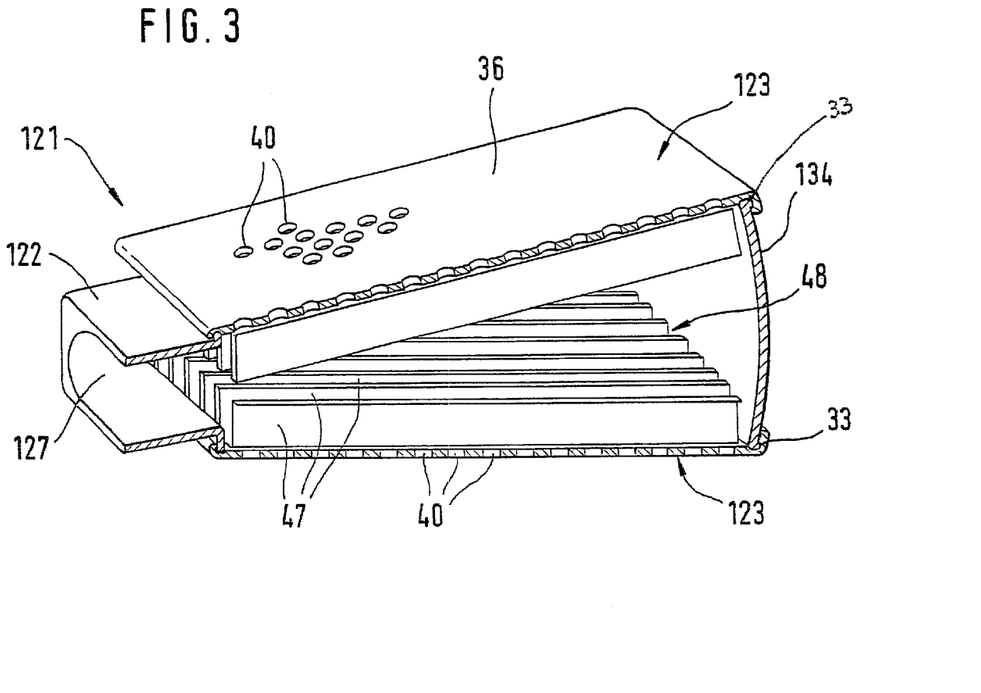
FIG. 3 is a three-dimensional longitudinal section through another exemplary embodiment of the dust box, with two covers.

FIG. 3 shows a three-dimensional longitudinal section through another exemplary embodiment of a dust box 121. Its dust injection fitting 122 with an injection opening 127 is adjoined at the back, the front, and the sides by the side walls 134, which virtually constitute a rectangular, wide ring which has a continuous bead 33 at the top side 36 and at the bottom and can be connected to a cover 123 there. The covers 123 each have a filter element 48 with rib-like lamellas 47 made of paper and have air openings 40.

Figure 4:
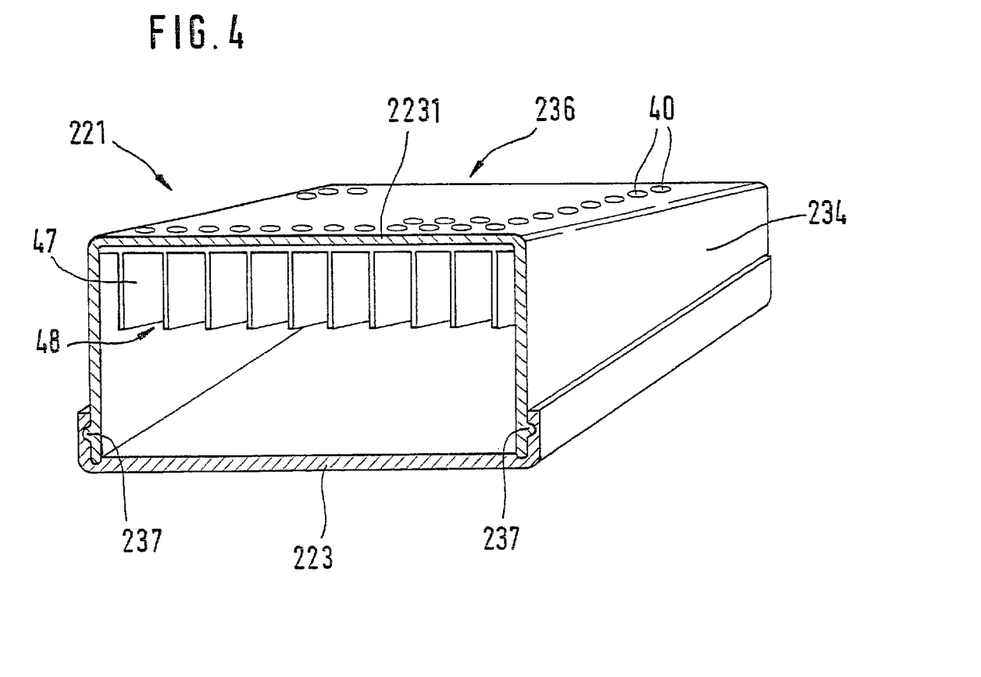
FIG. 4 is a cross section through another exemplary embodiment of a dust box with a drawer cover.

In a mirror image of the exemplary embodiment according to FIGS. 1 and 2, FIG. 4 shows a three-dimensional cross section through another exemplary embodiment of a dust box 221. Its upper part 2231 has a U-shaped cross section and has air openings 40 on its top side 236. At the bottom, the upper part 2231 is engaged on two opposite sides by a U-shaped airtight and dustproof cover 223, which can be moved in drawer fashion in longitudinal guide elements 237. On its inside, the upper part 2231 supports a filter element 48 with longitudinal folds 47. By sliding the cover 223 in relation to the top part, injected sanding dust can be emptied in a controlled fashion through the opening produced by the sliding motion. This means that an undesirable spilling of the dust can be prevented.

Figure 5:
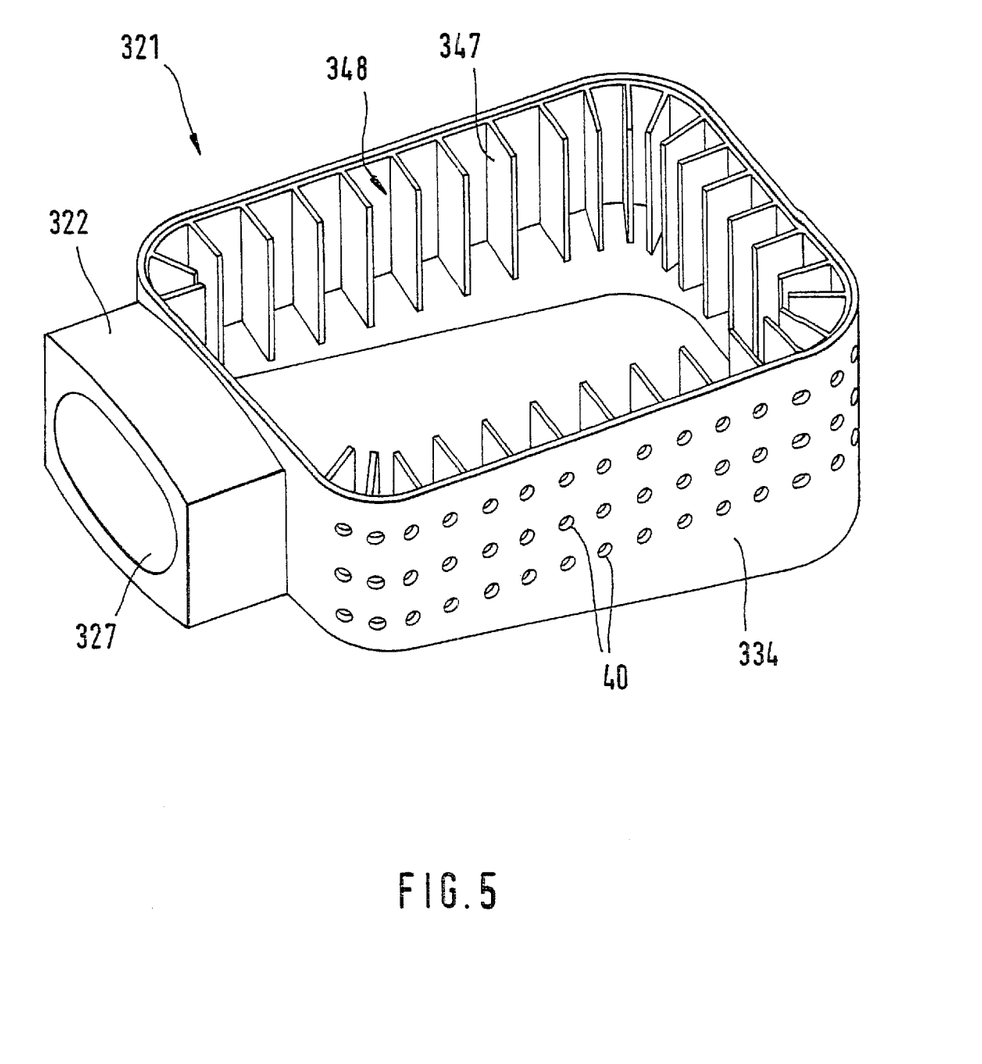
FIG. 5 shows another exemplary embodiment of a dust box, whose side walls are embodied as filter surfaces.

FIG. 5 is a three-dimensional top view of another exemplary embodiment of a dust box 321. Its side surfaces 334 constitute a wide, rounded, rectangular ring, which has an injection fitting 322 with its injection opening 327 at the front, wherein the side surfaces 334 have a number of uniformly distributed air openings 40 and on the inside—with the exception of the side that has the injection fitting 322—are provided with a continuous filter element 348 with lamellas 347. The top and bottom of the dust box 321 can be closed with covers, not shown, which can be airtight or can be provided with air openings and filter elements and thereby further increase the air permeability of the dust box 321 so that as a result, the dust suction of a power tool equipped with such a dust box is considerably improved.

Figure 6:
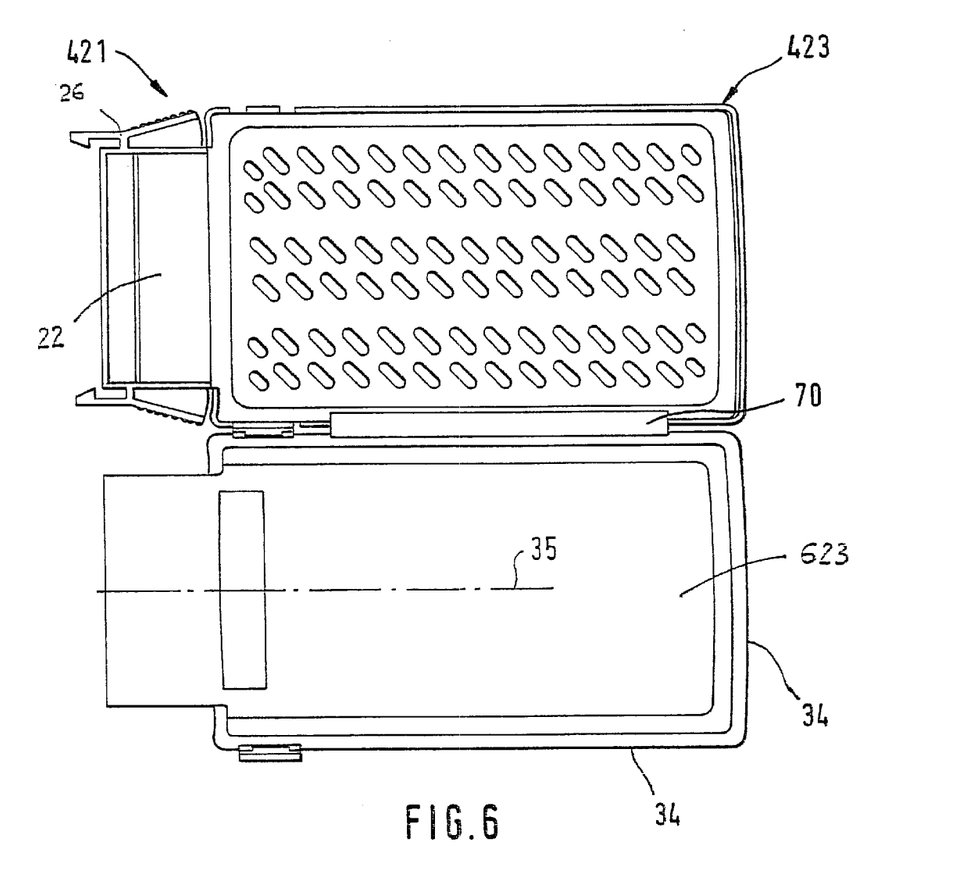
FIG. 6 is a top view of a dust box with a cover, which parts are coupled to each other by means of a longitudinal hinge.

FIG. 6 is a top view of another exemplary embodiment of the dust box 421, whose cover 423 has the injection fitting 22 and the tilt bars 26 and by means of a hinge 70 extending parallel to the longitudinal axis 35 of the dust box 421, is connected in a folding fashion to the bottom part 623 of the dust box 421 that supports the side walls 34.

Figure 7:
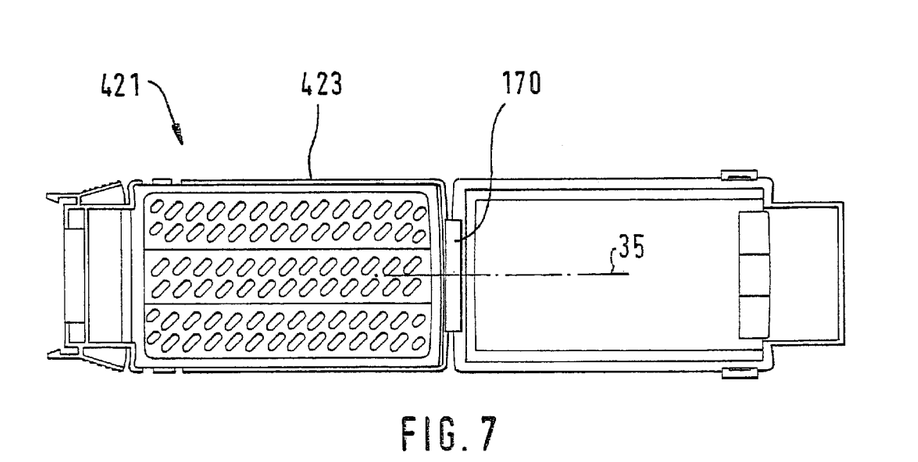
FIG. 7 is a top view of a dust box with a cover, which parts are coupled to each other by means of a lateral hinge.

In principle, FIG. 7 depicts the same dust box, wherein here, the cover 423 is coupled to the bottom part, which supports the side walls 34, by means of a hinge 170 extending lateral to the longitudinal axis. Coupling the cover 423 to the rest of the dust box 421 via a hinge 170 permits a gentle, controlled removal of the cover 423 from the dust box 421 so that an undesirable emptying of dust can be prevented.

Figure 8:
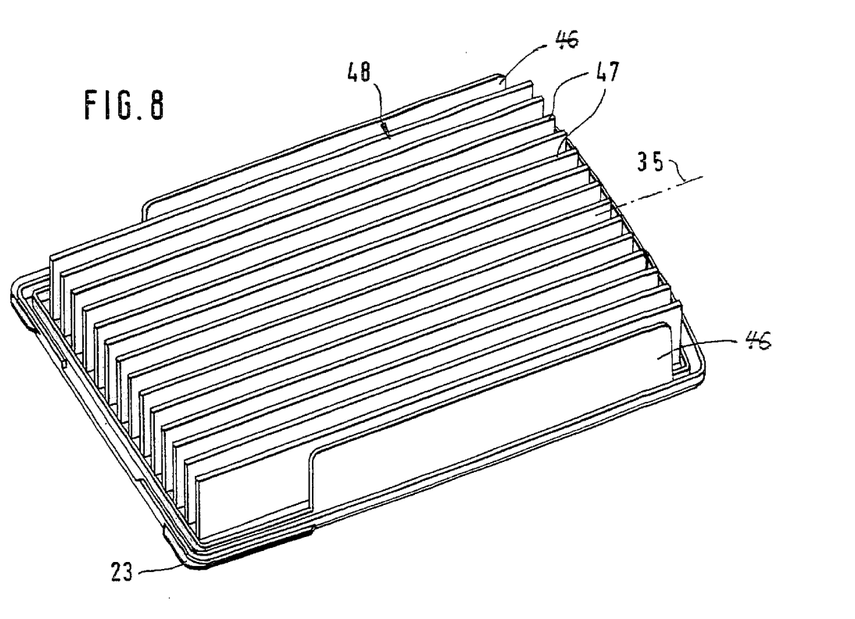
FIG. 8 is a bottom view of a dust box cover with filter lamellas extending parallel to the longitudinal axis.

FIG. 8 is a bottom view of the cover 23 belonging to the dust box 21 according to FIG. 1, with the filter element 48 whose rib-like lamellas 47 extend parallel to the longitudinal axis 35.

Figure 9:
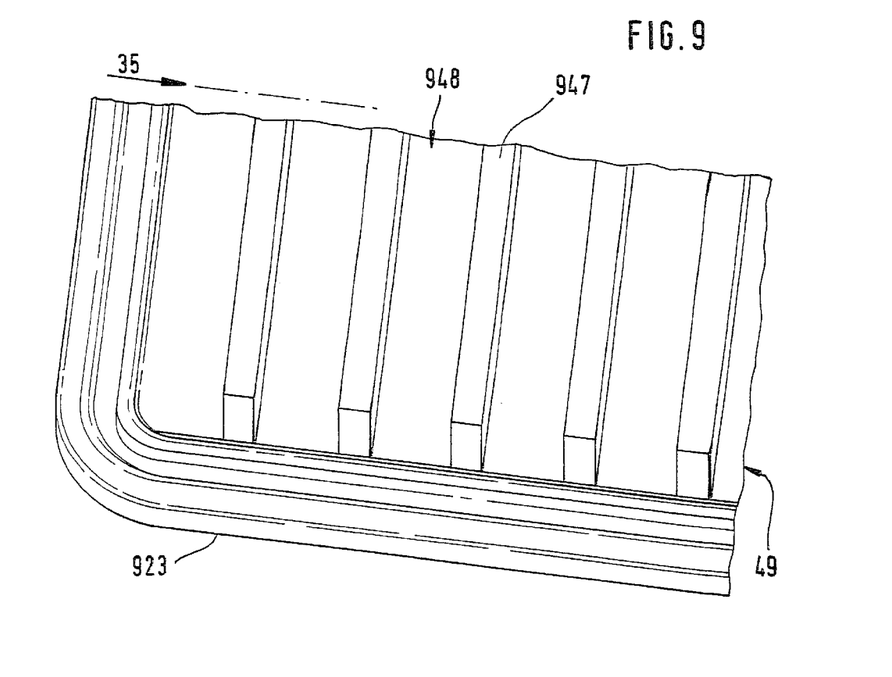
FIG. 9 is a bottom view of a dust box cover with filter lamellas extending lateral to the longitudinal axis.

FIG. 9 is a bottom view of a cover 923, which basically corresponds to the cover according to FIG. 8, but has a filter element 948 which is disposed so that its rib-like lamellas 947 extend lateral to the longitudinal axis 35 of the dust box.

Figure 10:
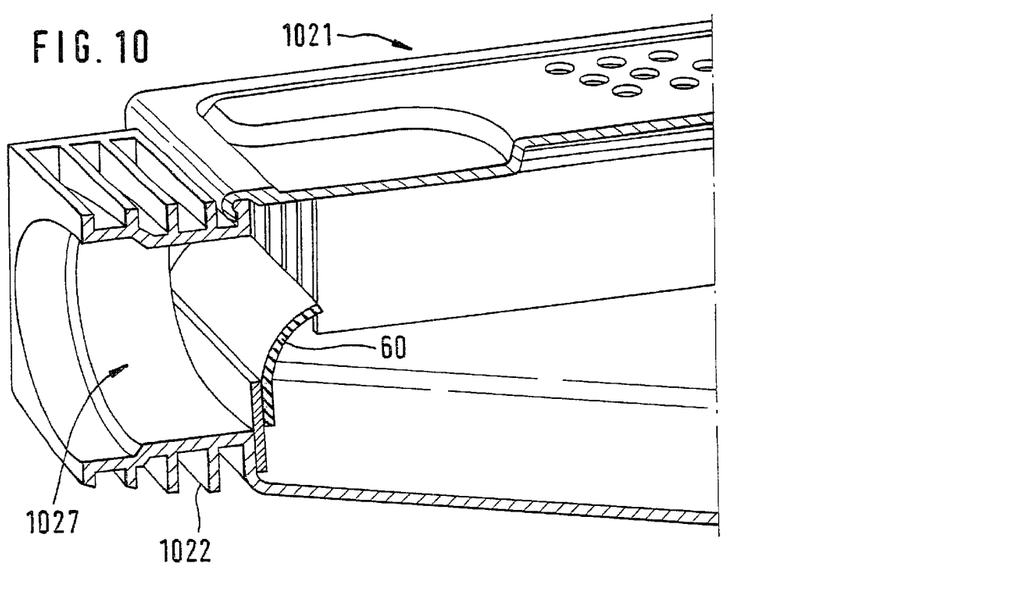
FIG. 10 shows a dust box with an elastic valve flap.

FIG. 10 shows a partial longitudinal section through another exemplary embodiment of a dust box 1021 in the vicinity of its injection fitting 1022, with a valve 60, which is embodied as a flap valve-like, bi-elastic flap and bends inward as shown in the drawing under the influence of the pressure of the incoming air.

At the moment in which the incoming air flow is interrupted, i.e. for the case in which the dust box 1021 is detached from the ejection fitting 20 of the power tool 10 even when the machine is running or in the moment that the motor of the power tool 10 is switched off, the valve 60 bends back against the inner surface of the injection fitting 22 again and closes its injection opening 1027. This considerably reduces the danger of an undesirable emptying of the dust box 1021.

Figure 11:
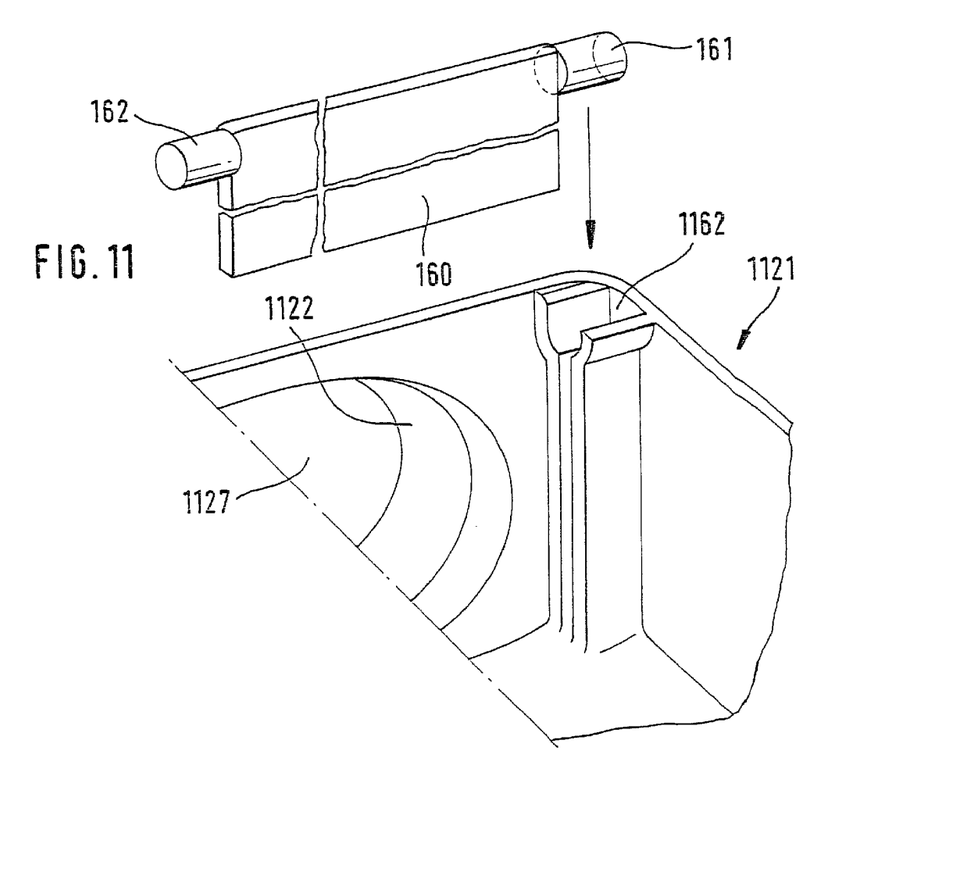
FIG. 11 shows a dust box with a rigid valve flap.

FIG. 11 shows a detailed top view of the region of the injection fitting 1122 of the dust box 1121. The injection opening 1127 there can be closed by a rigid valve flap 160, wherein the valve flap 160 can be suspended with axial supports 161 on both sides in bearing pedestal-like pivot bearing shells 1162 and actuated by gravity, closes the injection openings 1127 in corresponding pivot positions of the dust box 1121, when the motor of the power tool 10 is switched off, or when the dust box 1121 is detached from the power tool.

Figure 12:
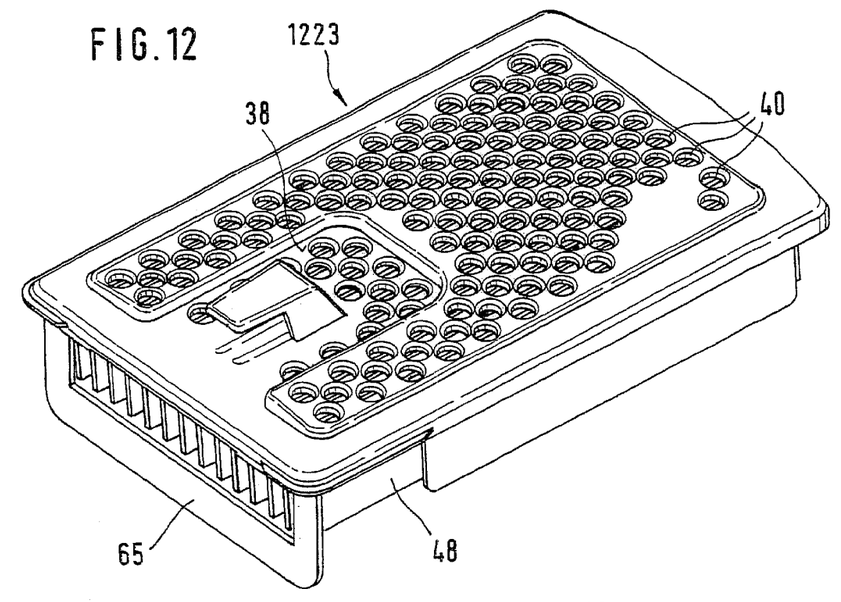
FIG. 12 shows a dust box cover with a dust baffle.

FIG. 12 is a three-dimensional depiction of a cover 1223, which in principle corresponds to the covers according to FIGS. 1, 2, and 8. The air openings 40 are visible on its top side and the filter element 48 is disposed on its opposite side.

In its a region associated with the injection opening 27 of the dust box 21, the cover 1223 has a dust baffle 65, which calms the incoming supplied air flow and guides it so that turbulence is reduced or entirely suppressed in the dust box 21 equipped with the cover 1223. This prevents the filter element 48 from becoming clogged by churned-up dust and considerably improves the efficiency of the dust removal suction of the power tool 10.

Figure 13:
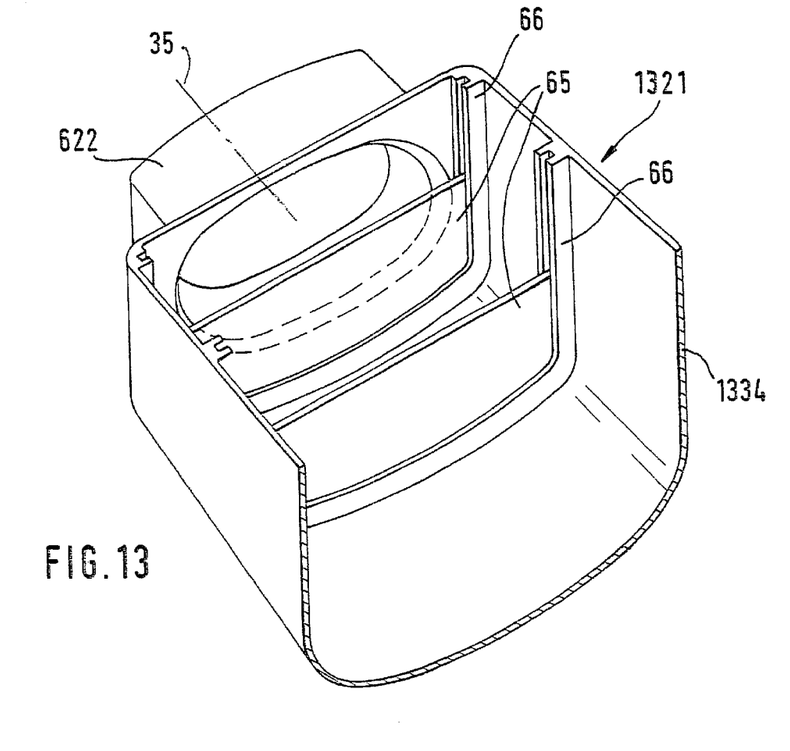
FIG. 13 shows a dust box with two inner dust baffles.

FIG. 13 shows a lower region of a dust box 1321 with the side walls 1334 into which a number of lamella-shaped dust baffles 65 are slid one behind the other lateral to the longitudinal axis 35 of the dust box 1321, which are held so that they are secured against sliding in U-profile-shaped guides 66. The dust baffles 65 have the same function as those in the cover according to FIG. 12. In addition, they form partition-like regions in the dust box 1321 in which injected sanding dust is stored so that it cannot shift back and forth in an undesirable manner when the dust box 1321 is moved.

Since not only the upper cover is used as an air-permeable filter, but other surfaces of the dust box are also included in this function, the dust box can be embodied as significantly smaller than it can with only a single cover.

By disposing the filter element with the folds lateral to the injection direction, turbulence is considerably reduced at high supply outputs of the dust delivery fan and the filling volume and the efficiency of the dust suction removal are improved. In lieu of a folded filter made of cellulose or plastic, other materials, e.g. nonwoven webs, can also be used in every instance.

The dust baffles prevent uncontrolled dust, turbulence which could lead to a premature clogging of the filter medium. As a result, the dust is steadily supplied along the longitudinal axis of the dust box until it reaches the rear wall, wherein the suction removal remains functional until the dust box is virtually 100% full.

The rigidity of the membrane material of the valve is dimensioned so that a dynamic pressure in the supply air flow of the fan 19 of at least 0.3 bar is sufficient to open the flap.

What is claimed is:

1. A power tool (10), comprising a dust suction device (19) integrated into its housing (12) and having an ejection fitting (20) which is connected to the dust suction device (19) and can be detachably fastened with an injection fitting (22) to a dustproof dust box (21), wherein said dust box (21) is made of an airtight and bending-resistant material, wherein a number of side walls (34) of the dust box (21) have air openings (40) and on the inside, support at least one folded filter (48), which overlaps the air openings (40).

2. The power tool according to claim 1, wherein the dust box (21) is a box, in particular a flat one, whose side walls (34) are constituted by detachable covers (23) wherein said detachable covers are provided with air openings (40) and support said at least one folded filter (48) on their insides.

3. The power tool according to claim 2, wherein the dust box (121) has a cover (23) respectively disposed on opposite sides, in particular the top and bottom.

4. The power tool according to claim 1, wherein side walls (334) of the dust box (321) which are perpendicular to the top transition into each other in ring fashion and have air openings (40), in particular uniformly distributed ones, which are overlapped on the inside by one of said at least one folded filter (48).

5. The power tool according to claim 4, wherein the dust box (121) is embodied as a skeletal body supported by the injection fitting (22) and can be equipped with covers (523) that can be closed in a dustproof fashion and can be used in a detachable manner, in particular covers that are each equipped with one of said at least one folded filter (48) and air openings (40).

6. The power tool according to claim 5, wherein at least one of the covers (23, 523) can be coupled to the dust box (221) by at least one hinge (70, 170).

7. The power tool according to claim 6, wherein the hinges (70, 170) are disposed parallel or lateral to a longitudinal axis (35) of the dust box (221).

8. The power tool according to claim 1, wherein the dust box (1021, 1121) has a valve (60, 160) on the inside, which closes injection fitting (1022, 1122) when the dust box (1021, 1121) is detached from the power tool (10) and which opens the injection fitting (1022, 1122) as soon as an air current coming from the machine acts on the valve (60, 160).

9. The power tool according to claim 8, wherein the valve (60) is embodied as an elastic valve flap.

10. The power tool according to claim 8, wherein the valve (160) is embodied as a swinging flap.

11. The power tool according to claim 1, wherein one of the covers (623) and/or the side walls (634) of the dust box (621) have dust baffles (625) aligned lateral to a longitudinal axis (35).

12. The power tool according to claim 1, wherein the dust box (21) is transparent at least in some areas, preferably on one of the side walls (34), wherein this region is used as a fill level indicator.

13. A power tool (10), comprising a dust suction device (19) integrated into its housing (12) and having an ejection fitting (20) which is connected to the dust suction device (19) and can be detachably fastened with an injection fitting (22) to a dustproof dust box (21), wherein a number of side walls (34) of the dust box (21) have air openings (40) and on the inside, support at least one filter element (48), in particular a folded filter, which overlaps the air openings (40), wherein a cover (23) is coupled to the side walls (34) of the dust box (121) so that it can be pulled out in a drawer fashion.

14. A power tool (10), comprising a dust suction device (19) integrated into its housing (12) and having an ejection fitting (20) which is connected to the dust suction device (19) and can be detachably fastened with an injection fitting (22) to a dustproof dust box (21), wherein a number of side walls (34) of the dust box (21) have air openings (40) and on the inside, support at least one filter element (48), in particular a folded filter, which overlaps the air openings (40), wherein folds (47) of the folded filter (48) are disposed lateral to a longitudinal axis of the dust box (221).

* * * * *